(12) United States Patent
Lamotte et al.

(10) Patent No.: US 7,126,135 B2
(45) Date of Patent: Oct. 24, 2006

(54) RADIATION PRETREATED STIMULABLE PHOSPHOR SCREEN OR PANEL

(75) Inventors: Johan Lamotte, Rotselaar (BE); Jean Verelst, Kontich (BE); Luc Struye, Mortsel (BE); Paul Leblans, Kontich (BE)

(73) Assignee: AGFA-Gevaert, Mortsel (BE)

( * ) Notice: Subject to any disclaimer, the term of this patent is extended or adjusted under 35 U.S.C. 154(b) by 368 days.

(21) Appl. No.: 10/736,926

(22) Filed: Dec. 16, 2003

(65) Prior Publication Data

US 2005/0077477 A1    Apr. 14, 2005

(30) Foreign Application Priority Data

Dec. 20, 2002    (EP)    ................................ 02102863

(51) Int. Cl.
*H05B 33/00* (2006.01)
(52) U.S. Cl. .................................................. 250/484.4
(58) Field of Classification Search .............. 250/484.4
See application file for complete search history.

(56) References Cited

U.S. PATENT DOCUMENTS

| 4,857,228 | A | * | 8/1989 | Kabay et al. | ......... | 252/301.4 S |
| 5,028,509 | A | | 7/1991 | Shimada et al. | ............ | 430/139 |
| 2003/0230739 | A1 | * | 12/2003 | Comanzo et al. | ..... | 252/304.4 R |

FOREIGN PATENT DOCUMENTS

EP    1 217 633    6/2002

OTHER PUBLICATIONS

Pedrero E. et al..: Analysis Of The Optical Behavior Of Eu2+ Ions In CsCl Crystals: Physica Status Solidi. B, Basic Research, Akademie Verlag, Berlin, DE, vol. 203, No. 2, 1998 pp. 591-598.
Patent Abstracts of Japan, vol. 2000, No. 16, May 8, 2001 & JP 2001 011437A (Fujitsu LTD), Abstract.
Partial European Search Report, EP 02 10 2863, Jun. 12, 2003, Jandl.

* cited by examiner

*Primary Examiner*—David Porta
*Assistant Examiner*—Marcus Taningco
(74) *Attorney, Agent, or Firm*—Joseph T. Guy; Nexsen Pruet, LLC

(57) ABSTRACT

A Eu-doped CsBr-type storage phosphor screen or panel has been disclosed, providing ratios of ultraviolet luminescence intensities of at least 10/9 after having been exposed to radiation having a wavelength in the range from 150 to 400 nm, measured at same sites without and with pretreatment exposure of said storage phosphor screen or panel with short ultraviolet radiation in the range from 150 to 300 nm and having an energy of 10 mJ/mm$^2$, as well as a method of producing a stimulable phosphor screen or panel, characterized in that during or after at least one of the manufacturing steps a radiation exposure treatment is given with radiation sources emitting short ultraviolet radiation in the range from 150 to 300 nm with an energy of at least 10 mJ/mm$^2$.

30 Claims, 2 Drawing Sheets

RADIATION PRETREATED STIMULABLE PHOSPHOR SCREEN OR PANEL

FIELD OF THE INVENTION

The present invention relates to a Eu-doped CsBr-type stimulable or storage phosphor screen or panel having increased speed or sensitivity.

BACKGROUND OF THE INVENTION

When manufacturing stimulable (storage) phosphor plates for digital imaging, all parameters are controlled with the highest care possible, as images should be obtained with the best information possible, i.a. an optimized signal to noise ratio. One of the most important factors related with that signal to noise ratio is speed (sensitivity) of the storage phosphors in the storage phosphor plate or panel.

A higher speed stands for detection of higher amounts of photons by the photomultiplier. Noise is directly related with the number of detected quanta and is proportional therewith.

Speed of a plate or panel for computed radiography, also called CR, is determined by the number of emitted photons per dose unit, set free by photostimulation of energy, stored in the stimulable phosphors after exposure to X-rays.

Improving speed for X-rays of imaging plates by heat treatment has already been described before in literature: such a treatment, known as "annealing" e.g. by heating during a time between 10 minutes and 15 hours at a temperature between 80 and 220° C. as exemplified in EP-A 1 217 633, requires quite a lot of time and such an application demands presence of heat resistant substrates as it should withstand at least such high temperatures, set forth.

OBJECTS AND SUMMARY OF THE INVENTION

As production is time consuming it is an ever lasting demand to provide efficient measures, less time consuming and destructive than e.g. heat treatment procedures in order to increase speed for storage phosphor panels in computed radiography.

It is therefor an object of the present invention to insure production of storage phosphor plates or panels providing an optimized signal to noise relationship in the images obtained when digitally processing said plates after X-ray exposure.

The above-mentioned advantageous effects have been realized by the specific features set out below.

Specific features for preferred embodiments of the invention are set out in the dependent claims.

Further advantages and embodiments of the present invention will become apparent from the following description [and drawings].

DETAILED DESCRIPTION OF THE INVENTION

Figure 1A:
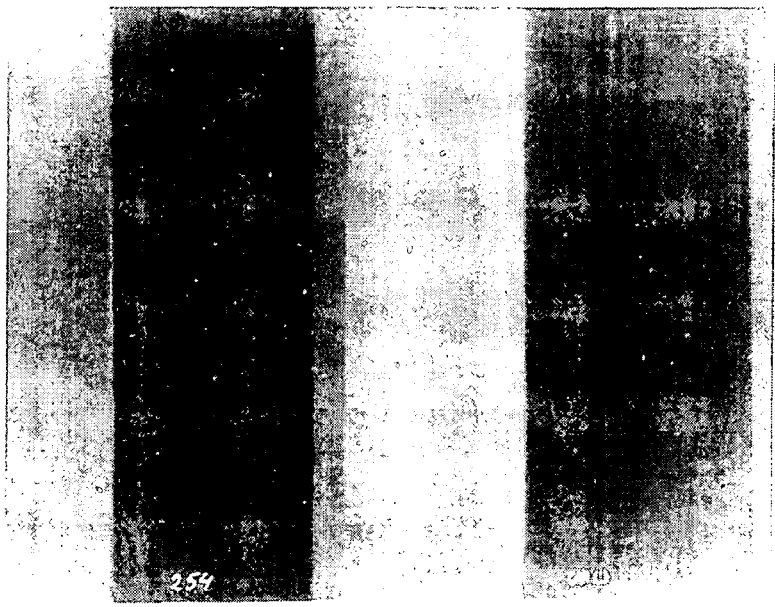
FIG. 1A shows 4 regions of a screen or panel, coated with a phosphor, pretreated before exposure in order to get a UV-luminescence signal: from left to right the regions were pretreated with radiation energy having wavelengths of 254 nm and 365 nm;
pretreated with radiation energy having a wavelength of 254 nm;
pretreated with radiation energy having a wavelength of 365 nm; and not pre-exposed.

It has surprisingly been established that the sensitivity of Eu-doped CsBr-type stimulable phosphors for X-rays is remarkably improved when an optical pretreatment is applied to the stimulable phosphor plate or panel: pretreatment at short ultraviolet wavelengths, preferably applied in the wavelength range from 150 nm up to 300 nm as e.g. by means of mercury vapor lamp emission at 254 nm, during a few seconds only, at a high intensity, offers a valuable tool to the manufacturer in order to reach the objects of the present invention set forth hereinbefore.

According to the present invention a Eu-doped CsBr-type storage phosphor screen or panel thus provides ratios of ultraviolet luminescence intensities of at least 10/9 after having been exposed to radiation having a wavelength in the range from 150 to 400 nm, measured at same sites of the screen or panel, once without and once with pretreatment of said storage phosphor screen or panel with short-ultraviolet radiation in the range from 150 to 300 nm, with an energy of at least 10 mJ/mm$^2$. In a more preferred embodiment according to the present invention the said storage phosphor screen or panel is provided wherein said ratio is at least 10/7, and even more preferred, wherein said ratio is at least 10/5.

Apart from an ultraviolet radiation source use is advantageously made from ultraviolet lasers. Examples of said ultraviolet lasers are a quadruplicated Nd:YAG laser at 266 nm—thereby making use of the fourth harmonic of said laser, normally exciting at 1064 nm—quadruplicated Nd:YLF and Nd:YVO lasers. Nd:YLF lasers, made available by QUANTRONIX Corporation 41 Research Way East Setauket N.Y. 11733, USA, are even suitable for use at differing wavelengths, namely at 209, 211, 262 and 263 nm. In the alternative an Alexandrite laser emitting at 193 nm, produced by LIGHT AGE, Inc., Two Riverview Drive Somerset, N.J. 08873, USA, is advantageously used.

Even more surprising is presence of a lower ultraviolet luminescence signal, after application of such an optical or radiation pretreatment. If a lower ultraviolet luminescence signal is detected after such a pretreatment with ultraviolet radiation in the short UV range (150–200 nm to 300 nm), an effective increase of speed or sensitivity of the storage phosphor plate is effectively attained.

UV luminescence (at 254 and 365 nm, after irradiation with 254 nm) on the contrary thus shows a decreasing efficiency, even up to 50%! A ratio of up to 2:1 (10/5) for the ultraviolet luminescence signals, respectively before and after short UV-pretreatment, is thus measured, wherein irradiation pretreatment of the storage phosphor plate proceeds with radiation having a wavelength of e.g. 254 nm (as in case of a mercury lamp) or 266 nm (as in case of a UV-laser).

According to the present invention optical exposure pretreatment in order to increase sensitivity or speed of Eu-doped CsBr-type storage phosphor panels has been realized by irradiation with radiation sources selected from the group consisting of a mercury vapor lamp (at 254 nm), a deuterium lamp, a xenon lamp and a krypton lamp (both providing selected emission lines in the desired short ultraviolet range between 200 nm and 300 nm), a quadruplicated Nd:YAg laser at 266 nm—making use of the fourth harmonic oscillation—, dye lasers having an ultraviolet emitting dye (such as e.g. BMT—benzene-methanethiol—and PTP—p-Terphenyl $C_{18}H_{14}$), excimer lasers (e.g. those with a gas as $F_2$, ArF (193 nm), KrF (248 nm), XeBr (282 nm) or XeCl (308 nm), and frequency-enhanced (doubled- or quadruplicated) diode lasers.

According to the present invention it is not excluded to combine this ultraviolet irradiation pretreatment with the formerly known heat treatment as set out in the background of the present invention: combination of both pretreatment techniques further combines the advantages offered by both.

According to the present invention an ultraviolet pretreatment is applied in the manufacturing process during or after one or more steps as e.g. during or after vaporization of the raw stock materials (wherein the ultraviolet radiation source is mounted in the vaporization apparatus), during the step between vaporization and heat treatment, during heat treatment (providing presence of the ultraviolet source in the oven wherein heating proceeds).

Following advantageous effects, apart from speed increase, are obtained by the short ultraviolet treatment set forth hereinbefore, thereby providing particularly suitable applications.

According to the present invention the exposure pretreatment method is applicable to Eu-doped CsBr-type storage phosphor plates, showing lack for homogeneity in speed (sensitivity) over the surface of the plate or panel. When varying the intensity of the short-UV-pretreatment as a function of speed differences over the said surface (e.g. by means of a compensating filter equalising differences as measured before), speed is not only increased, but homogeneity is improved and even corrected in order to have an excellent speed level and equal speed distribution over the whole panel surface. So sites showing an inferior speed are "corrected in speed" by a higher short-UV pretreatment dose than sites showing a higher speed.

According to the present invention a method is thus offered of producing a Eu-doped CsBr-type stimulable phosphor screen or panel having homogeneous speed distribution over its surface by radiation exposure treatment with energy from a radiation source emitting short ultraviolet radiation in the range from 150 to 300 nm to the said storage phosphor plate or panel originally having inhomogeneous speed distribution over its panel surface by the step of compensating deviations from speed homogeneity point by point by scanning the panel with said radiation source by the step of emitting variable energy amounts in order to compensate for the said deviations.

Further according to the present invention a method of producing a Eu-doped CsBr-type stimulable phosphor screen or panel is offered, said screen or panel having homogeneous speed distribution over its surface by radiation exposure treatment with energy from a radiation source emitting short ultraviolet radiation in the range from 150 to 300 nm to the said storage phosphor plate or panel, originally having inhomogeneous speed distribution over its panel surface surface by the step of compensating deviations from speed homogeneity by integrally irradiating the screen or panel, after covering it partially with one or more filters having differing densities, thus partially absorbing radiation source emitting short ultraviolet radiation in the range from 150 to 300 nm at differing parts.

A method is further offered, providing inscription of markings with a short-UV-laser in a storage phosphor screen or panel, and more preferably in Eu-doped CsBr-type storage phosphor panel in order to make identification possible: differences obtained in ultraviolet luminescence afterwards, after having the panel exposed to ultraviolet radiation, which preferably has a longer wavelength. Also a reading out procedure with the same wavelength still provides acceptable results, although, when proceeding marking on the complete surface, a text becomes less clearly visible, so that in practice a longer wavelength is preferable. Visibility of such mar-kings due to differences in ultraviolet luminescence thus provides opportunities for practical applications. Apart for the modern, flexible and programmable identification mark or inscription by means of laser having a wavelength in the range from 150 to 300, reason why use of a laser is preferable and recommended, it is not excluded to provide markings by means of a mercury vapor lamp or similar means, and also by means of a mask. The markings will have a lower density as luminescence decreases and, as the marked sites have a higher speed when exposed to X-rays, it is clear that the marked sites will moreover be visible in the image obtained after digitally processing the screen or panel.

Thus according to the present invention a method is offered of providing a storage phosphor panel with an identification mark or inscription by means of laser, mercury vapor lamp or a mask, wherein marking proceeds with a laser having a wavelength in the range from 150 to 300 nm. According to the method of the present invention said identification mark or inscription is a readable text (with figures and characters) or a machine readable code, and further according to the method of the present invention said identification mark or inscription is a bar code.

According to the present invention a Eu-doped CsBr-type storage phosphor screen or panel comprises a CsBr:Eu stimulable phosphor, prepared by a method comprising the steps of:

mixing said CsBr with between $10^{-3}$ and 5 mol % of an Europium compound selected from the group consisting of $EuX'_2$, $EuX'_3$ and $EuOX'$, X' being a member selected from the group of halides, being F, Cl, Br and I, firing said mixture at a temperature above 450° C.

cooling said mixture and recovering the CsBr:Eu phosphor.

Still more preferred the Eu-doped CsBr-type phosphor screen according to the present invention is a binderless storage phosphor screen, containing a CsBr:Eu stimulable phosphor, wherein said screen is prepared by a method comprising the steps of:

mixing said CsBr with between $10^{-3}$ and 5 mol % of an Europium compound selected from the group consisting of $EuX'_2$, $EuX'_3$ and $EuOX'$, X' being a halide selected from the group consisting of F, Cl, Br and I;

bringing said mixture in condition for vapor deposition and depositing said mixture on a substrate by a method selected from the group consisting of physical vapor deposition, thermal vapor deposition, chemical vapor deposition, electron beam deposition, radio frequency deposition and pulsed laser deposition.

In another embodiment according to the present invention a storage phosphor screen is provided, wherein said phosphor is a CsBr:Eu stimulable phosphor, wherein said screen is prepared by a method comprising the steps of mixing said CsBr with between $10^{-3}$ and 5 mol % of a Europium compound selected from the group consisting of $EuX'_2$, $EuX'_3$ and $EuOX'$, X' being a halide selected from the group consisting of F, Cl, Br and I; firing said mixture at a temperature above 450° C.; cooling said mixture and recovering the CsBr:Eu phosphor; followed by making a lacquer, based on said phosphor, on one or more polymer binders and one or more solvents; coating said lacquer on a substrate and drying a coated layer in order to provide a coated CsBr:Eu phosphor layer.

According the present invention a method is offered of producing a stimulable phosphor screen or panel characterized in that during or after at least one of the manufacturing steps a radiation exposure treatment is given with energy from radiation sources emitting short ultraviolet radiation in the range from 150 nm to 300 nm with an energy of at least 10 mJ/mm$^2$.

Further a method for producing a binderless Eu-doped CsBr-type storage phosphor screen according to the present invention is offered, said method comprising the steps of:
providing a Eu-doped CsBr-type storage phosphor
vacuum depositing said phosphor on a substrate characterized in that during said vacuum depositing step said substrate is kept at a temperature T, such that 50° C.$\leq$T$\leq$300° C. and that said vacuum deposition proceeds ion an Ar-atmosphere with an Ar-pressure of at most 3 Pa, characterized in that during or after at least one of the said steps a radiation exposure treatment is given with energy from radiation sources emitting short ultraviolet radiation in the range from 150 nm to 300 nm.

Moreover in a further preferred embodiment a method for producing a binderless storage phosphor screen is offered, said method comprising the steps of:
combining phosphor precursors for an alkali metal halide storage phosphor, more preferably a Eu-doped CsBr-type phosphor,
vacuum depositing said combination of phosphor precursors on a substrate characterized in that during said vacuum depositing step said substrate is kept at a temperature T, such that 50° C.$\leq$T$\leq$300° C. and said vacuum deposition proceeds in an Ar-atmosphere with an Ar-pressure of at most 3 Pa, characterized in that during or after at least one of the said steps a radiation exposure treatment is given with energy from radiation sources emitting short ultraviolet radiation in the range from 150 nm to 300 nm.

According to the present invention a method for producing a binderless CsBr:Eu phosphor screen is further offered, comprising the steps of:
mixing or combining CsBr with between $10^{-3}$ mol % and 5 mol % of a europium compound,
vapor depositing that mixture onto a substrate, forming a binderless phosphor screen,
cooling said phosphor screen to room temperature,
bringing said phosphor screen to a temperature between 80 and 220° C. and
maintaining it at that temperature for between 10 minutes and 15 hours,
characterized in that during or after at least one of the said steps a radiation exposure pretreatment is given with energy from radiation sources emitting short ultraviolet radiation in the range from 150 nm to 300 nm.

In the methods according to the present invention as described above, said radiation source is selected from the group consisting of a mercury vapor lamp at 254 nm, a deuterium lamp, a xenon lamp, a krypton lamp, a quadruplicated—frequency enhanced—Nd:YAG, Nd:YLF, a Nd:YVO or an Alexandrite laser, a dye laser, an excimer laser and a frequency-doubled diode laser.

More preferably, according to the method of the present invention, said radiation source is selected from the group of gas excimer lasers consisting of $F_2$ (157 nm), ArF (193 nm), KrF (248 nm), XeBr (282 nm) and XeCl (308 nm).

Identification is another important application with respect to controll of the production as a function of the raw stock materials used during manufacturing of the storage phosphor screens or panels.

While the present invention will hereinafter be described in connection with preferred embodiments as in the examples thereof, it will be understood that it is not intended to limit the invention to those embodiments.

EXAMPLES

Preparation of the Phosphor Screens.
CsBr:Eu screens were made via thermal vapor deposition of CsBr and EuOBr. Therefor CsBr was mixed with EuOBr and placed in a container in a vacuum deposition chamber. The phosphor was deposited on a glass disk with a thickness of 1.5 mm and a diameter of 40 mm. The distance between the container and the substrate was 10 cm. During evaporation, the substrate was rotated at 12 r.p.m.
The container with starting materials was heated to a temperature of 750° C. Before the start of the evaporation, the chamber was evacuated to a pressure of $4.10^{-5}$ mbar. During the evaporation process, Ar was introduced in the chamber at a pressure between 1.0 and 2.5 Pa, whereas the substrate was heated up to a temperature of 150° C. The Eu-concentration in the evaporated screen was measured with X-ray fluorescence and was of the order of 800 ppm.
Scanning Electron Microscopy (SEM) provided information about the morphology of the deposited phosphor layer: the phosphor layer was made up of needle shaped crystals.

Controlling under UV radiation (having a wavelength of 254 nm or 365 nm, as the experiments have been performed with the 254 nm line and the 365 nm line of a mercury vapor lamp—although radiation from the whole excitation spectrum in the range from 200 to 400 nm is not excluded and provides acceptable results) of the stimulable phosphor screen or panel thus obtained, led to the conclusion that a less intense UV luminescence signal was obtained at sites on the screen or panel, previously exposed to short-UV-rays with a radiation wavelength of 254 nm, obtained by a mercury lamp during 2 seconds or with the radiation wavelength of 266 nm obtained by a UV laser in the millisecond time range.

Exposure of the panel to radiation having a wavelength outside the range of 150 to 300 nm however as applied in practice with a radiation source of 365 nm does not show any influence upon UV luminescence.

In another experiment wherein the screen or panel has partially been covered with aluminum strips in order to have 4 differing fields, followed by exposure, one by one, as indicated hereinafter, and further exposed integrally after simultaneous removal of all aluminum strips in order to get UV luminescence, shows a clearly lower luminescence for those parts of the panel which were treated with a radiation energy having a wavelength of 254 nm before.

This effect has been shown in FIG. 1A (showing as differing parts from left to right)

a field having been exposed afterwards to 254 nm+365 nm (intermediate density);

a field having been exposed afterwards to 254 nm (most dark field as showing less UV luminescence);

a field having been exposed to 365 nm (emitting most UV luminescent radiation and therefor looking the brightest field) and a "comparison field" (where aluminum strips were not removed and which was thus not exposed to UV as an aftertreatment.

Figure 1B:
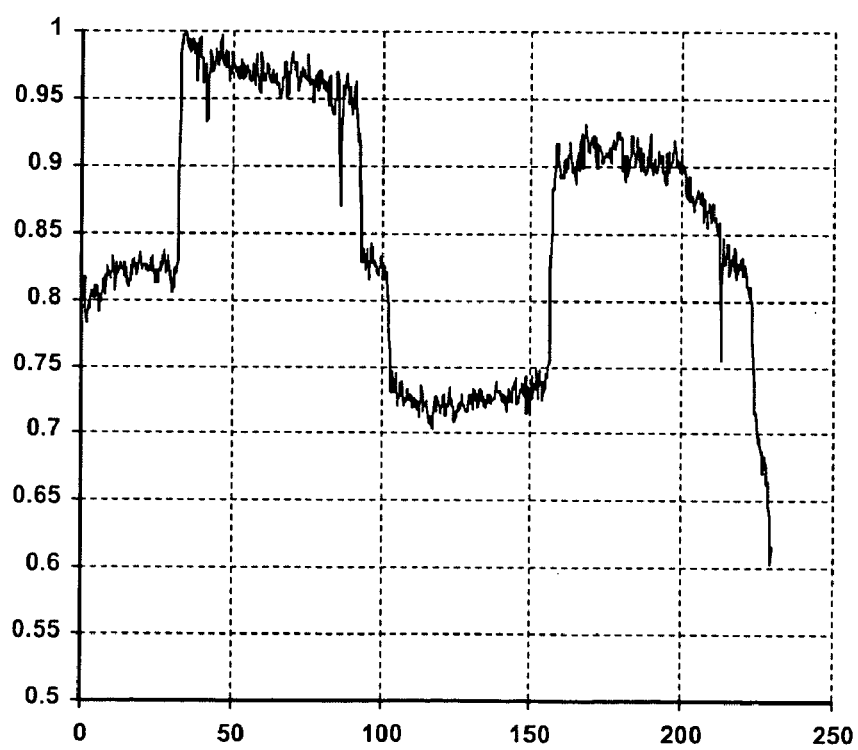
FIG. 1B shows the corresponding sensitivity profile of the different regions of the storage phosphor panel (further explained in the examples hereinafter).

The corresponding sensitivity profiles for the different fields, measured as "SAL" have been illustrated in FIG. 1B. The sensitivities of those different fields or zones on the screen were measured in the following way: the screens were homogeneously exposed with a dose of ca. 50 mR at 80 kVp. Read-out was done in a flying spot scanner. In the scanner, the scanning light source was a 30 mW diode laser emitting at 685 nm. A 3-mm BG-39® (trade name of Schott) filter coated at both sides with a dielectrical layer was used in order to separate the stimulation light from the screen emission light. The scan-average levels (SAL's) were determined as the average signal produced by the screen fields in the photomultiplier tube.

As a result an unambiguous increase of sensitivity has been found for the zone after an exposure treatment to radiation with a wavelength of 254 nm: an increase from about 400 nm (comparison zone) to 540 (zone with highest sensitivity) represents a convincing sensitivity increase of about 35%!

UV post-treatment has thus advantageously been applied: regions of the sheet or panel showing decreased ultraviolet luminescence after exposure to radiation having a wavelength of 254 nm show a sensitivity which is increased versus the non-exposed areas with about 35%!

Figure 2A:
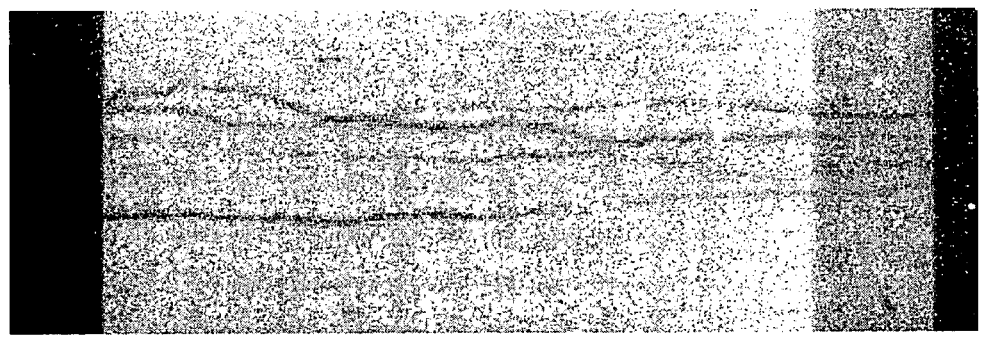
FIG. 2A is illustrative for the inscription or marking ability with a UV-laser (266 nm) of storage phosphor panels when not pre-exposed to radiation having a wavelength of 254 nm. The phosphor plate can be marked with an ultraviolet laser, e.g. at 266 nm, even without pre-exposure, but the effect described herein is not detectable on those sites that have been exposed to radiation at 254 nm anymore, as those sites are saturated.

Inscriptions in form of a line with a UV laser having an exposure wavelength of 266 nm laser have been illustrated in FIG. 2A.

The patterns thus created have been examined during some time and have been proved to be relatively stable: after 12 hours the pattern is still clearly present, as well as after a heat treatment during 4 hours at 170° C.

Figure 2B:
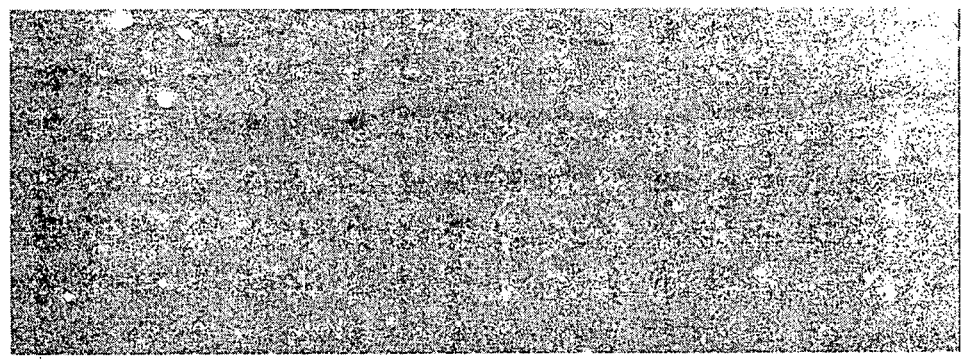
FIG. 2B is illustrative for the inscription or marking ability with a UV-laser (e.g. 266 nm) of storage phosphor panels when pre-exposed to radiation having a wavelength of 254 nm: due to a "saturation effect" the visibility at 254 nm is decreased.

FIG. 2B shows the X-ray images obtained from the lines having been marked with a UV laser when the storage phosphor plate was pretreated with UV exposure having a wavelength of 254 nm: the storage plate or panel seems to be "saturated" as the laser exposure does not show a real inscription effect. Once saturated a laser inscription has reduced effect. It has been shown unambiguously that with a short-UV-pretreatment X-ray sensitivity or speed is enhanced. Once an increase up to 35% (which is a very remarkable level) has been attained, saturation effects make that no further inscription is possible, thus putting a bar on it.

Opposite thereto the surface pretreated with a 365 nm exposure shows the best inscriptions with a UV laser afterwards (see FIG. 2A): the signal is most clearly expressed in the most dark parts where a maximum signal appears, whereas the brightest parts do not show any signal).

Erasure of the pattern by an erasure procedure as is well-known in the field of storage phosphor plates handling before re-use is not possible. There are indications that a combination of heat treatment and exposure to radiation with a radiation source emitting radiation having a wavelength of 365 nm provides erasure of undesired information. The said heat treatment of the storage phosphor plate or panel is applied in steps, before, during or after irradiation, or a combination thereof, with a radiation source emitting radiation having longer wavelengths (more than 300 nm as e.g. the 365 nm wavelength mentioned hereinbefore).

Having described in detail preferred embodiments of the current invention, it will now be apparent to those skilled in the art that numerous modifications can be made therein without departing from the scope of the invention as defined in the appending claims.

What is claimed is:

1. Method of producing a stimulable phosphor screen or panel characterized in that during at least one of the manufacturing steps a radiation exposure treatment is given with energy from radiation sources emitting ultraviolet radiation in the range from 150 nm to 300 nm with an energy of at least 10 mJ/mm$^2$.

2. Method of producing a stimulable phosphor screen or panel according to claim 1, wherein said phosphor is a CsBr:Eu phosphor.

3. Method of producing a stimulable phosphor screen or panel according to claim 2, wherein said CsBr:Eu phosphor is prepared by a method comprising the steps of:

mixing said CsBr with between $10^{-3}$ and 5 mol % of a Europium compound selected from the group consisting of EuX'$_2$, EuX'$_3$ and EuOX', X' being a member selected from the group consisting of F, Cl, Br and I, firing said mixture at a temperature above 450° C.

cooling said mixture and recovering the CsBr:Eu phosphor.

4. Method of producing a stimulable phosphor screen or panel according to claim 2, wherein said CsBr:Eu phosphor is prepared by a method comprising the steps of:

mixing CsBr with between $10^{-3}$ and 5 mol % of a Europium compound selected from the group consisting of EuX'$_2$, EuX'$_3$ and EuOX', X' being a halide selected from the group consisting of F, Cl, Br and I;

bringing said mixture in condition for vapor deposition and depositing said mixture on a substrate by a method selected from the group consisting of physical vapor deposition, thermal vapor deposition, chemical vapor deposition, electron beam deposition, radio frequency deposition and pulsed laser deposition.

5. Method of producing a stimulable phosphor screen or panel according to claim 2 wherein, said CsBr:Eu phosphor is prepared by a method comprising the steps of:

providing a CsBr:Eu storage phosphor vacuum depositing said phosphor on a substrate characterized in that during said vacuum depositing step said substrate is kept at a temperature T, such that 50° C.≦T≦300° C. and that said vacuum deposition proceeds in an Ar-atmosphere with an Ar-pressure of at most 3 Pa.

6. Method of producing a stimulable phosphor screen or panel according to claim 2 wherein, said CsBr:Eu phosphor is prepared by a method comprising the steps of:

combining phosphor precursors for a CsBr:Eu storage phosphor, vacuum depositing said combination of phosphor precursors on a substrate characterized in that during said vacuum depositing step said substrate is kept at a temperature T, such that 50° C.≦T≦300° C. and said vacuum deposition proceeds ion an Ar-atmosphere with an Ar-pressure of at most 3 Pa.

7. Method of producing a stimulable phosphor screen or panel, according to claim 2, said CsBr:Eu phosphor is prepared by a method comprising the steps of:

mixing or combining CsBr with between $10^{-3}$ mol % and 5 mol % of a europium compound, vapor depositing that mixture onto a substrate, forming a binderless phosphor screen, cooling said phosphor screen to room temperature, bringing said phosphor screen to a temperature between 80 and 220° C. and maintaining it at that temperature for between 10 minutes and 15 hours.

8. Method of producing a stimulable phosphor screen or panel according to claim 2, wherein said radiation exposure treatment is given with a radiation source selected from the group consisting of a mercury vapor lamp, a deuterium lamp, a xenon lamp, a krypton lamp, a frequency enhanced diode lasers, a dye lasers having an ultraviolet emitting dye and excimer laser.

9. Method of producing a stimulable phosphor screen or panel of claim 2, wherein said CsBr:Eu phosphor is prepared by a method comprising the steps of:

mixing said CsBr with between $10^{-3}$ and 5 mol % of a europium compound selected from the group consisting of $EuX'_2$, $EuX'_3$ and EuOX', X' being a halide selected from the group consisting of F, Cl, Br and I;

firing said mixture at a temperature above 450° C.;

cooling said mixture and recovering the CsBr:Eu phosphor;

making a lacquer comprising said phosphor, at least one polymer binder and at least one solvent; and coating said lacquer on a substrate and drying said coating.

10. Method of producing a stimulable phosphor screen or panel according to claim 2, wherein said radiation exposure treatment proceeds by the step of compensating deviations from speed homogeneity point by point by scanning the panel with said radiation source by the step of emitting variable energy amounts in order to compensate for said deviations.

11. Method of producing a stimulable phosphor screen or panel according to claim 10, wherein said radiation source is selected from the group consisting of a mercury vapor lamp, a deuterium lamp, a xenon lamp, a krypton lamp, a frequency enhanced diode lasers dye lasers having an ultraviolet emitting dye and excimer lasers.

12. Method of producing a stimulable phosphor screen or panel according to claim 11, wherein said frequency enhanced diode lasers are selected from—Nd:YAg, Nd:YFL, a Nd:YVO or an Alexandrite laser.

13. Method of producing a stimulable phosphor screen or panel according to claim 11, wherein said eximer lasers are gas excimer lasers selected from $F_2$, ArF, KrF, XeBr and XeCl.

14. Method of producing a stimulable phosphor screen or panel according to claim 11 wherein said dye lasers are benzene-methanediol or p-terphenyl dye lasers.

15. Method of producing a stimulable phosphor screen or panel according to claim 1, wherein said radiation exposure treatment proceeds by the step of compensating deviations from speed homogeneity point by point by scanning the panel with said radiation source by the step of emitting variable energy amounts in order to compensate for said deviations.

16. Method of producing a stimulable phosphor screen or panel according to claim 15, wherein said radiation exposure is given with a radiation source selected from the group consisting of a mercury vapor lamp at 254 nm, a deuterium lamp, a xenon lamp, a krypton lamp, frequency enhanced diode layers, dye lasers having an ultraviolet emitting dye and, excimer laser.

17. Method of producing a stimulable phosphor screen or panel according to claim 16, wherein said frequency enhanced diode lasers are selected from—Nd:YAg, Nd:YFL, a Nd:YVO or an Alexandrite laser.

18. Method of producing a stimulable phosphor screen or panel according to claim 16, wherein said excimer lasers are gas excimer lasers selected from $F_2$, ArF, KrF, XeBr and XeCl.

19. Method of producing a stimulable phosphor screen or panel according to claim 16 wherein said dye lasers are benzene-methanediol or p-terphenyl dye lasers.

20. Method of producing a stimulable phosphor screen or panel according to claim 1, wherein said radiation exposure treatment is given with a radiation source selected from the group consisting of a mercury vapor lamp at 254 nm, a deuterium lamp, a xenon lamp, a krypton lamp, a frequency enhanced diode lasers, dye lasers having an ultraviolet emitting dye and excimer laser.

21. Method of producing a stimulable phosphor screen or panel according to claim 1 wherein said radiation exposure treatment proceeds by the step of compensating deviations from speed homogeneity by integrally irradiating the screen or panel, after covering said screen or panel partially with one or more filters having differing densities at differing parts.

22. Method of producing a stimulable phosphor screen or panel according to claim 21, wherein said radiation source is selected from the group consisting of a mercury vapor lamp, a deuterium lamp, a xenon lamp, a krypton lamp, a frequency enhanced diode lasers dye lasers having an ultraviolet emitting dye and excimer lasers.

23. Method of producing a stimulable phosphor screen or panel according to claim 22, wherein said frequency enhanced diode lasers ar selected from—Nd:YAg, Nd:YFL, a Nd:YVO or an Alexandrite laser.

24. Method of producing a stimulable phosphor screen or panel according to claim 22, wherein said eximer lasers are gas excimer lasers selected from $F_2$, ArF, KrF, XeBr and XeCl.

25. Method of producing a stimulable phosphor screen or panel according to claim 22 wherein said dye lasers are benzene-methanediol or p-terphenyl dye lasers.

26. Method of producing a stimulable phosphor screen or panel according to claim 2 wherein said radiation exposure treatment proceeds by the step of compensating deviations from speed homogeneity by integrally irradiating the screen or panel, after covering said screen or panel partially with one or more filters having differing densities at differing parts.

27. Method of producing a stimulable phosphor screen or panel according to claim 26, wherein said radiation source is selected from the group consisting of a mercury vapor lamp, a deuterium lamp, a xenon lamp, a krypton lamp, a frequency enhanced diode lasers dye lasers having an ultraviolet emitting dye and excimer lasers.

28. Method of producing a stimulable phosphor screen or panel according to claim 27, wherein said frequency enhanced diode lasers are selected from—Nd:YAg, Nd:YFL, a Nd:YVO or an Alexandrite laser.

29. Method of producing a stimulable phosphor screen or panel according to claim 27, wherein said eximer lasers are gas excimer lasers selected from $F_2$, ArF, KrF, XeBr and XeCl.

30. Method of producing a stimulable phosphor screen or panel according to claim 27 wherein said dye lasers are benzene-methanediol or p-terphenyl dye lasers.

* * * * *